(12) United States Patent
Cimino

(10) Patent No.: US 6,543,972 B1
(45) Date of Patent: Apr. 8, 2003

(54) DEVICE TO HELP DETERMINE KEY CUT ATTRIBUTES

(76) Inventor: William J Cimino, 325 Rice Ave., Revere, MA (US) 02151

( * ) Notice: Subject to any disclaimer, the term of this patent is extended or adjusted under 35 U.S.C. 154(b) by 0 days.

(21) Appl. No.: 09/605,792

(22) Filed: Jun. 27, 2000

(51) Int. Cl.[7] .............................. B23C 3/28; G06K 9/00; G05B 1/00

(52) U.S. Cl. ........................ 409/83; 250/202; 356/613; 382/100; 700/161

(58) Field of Search ...................... 409/81–83; 382/100, 382/152, 8; 250/202, 560; 356/376, 393; 358/291, 292, 293; 700/161

(56) References Cited

U.S. PATENT DOCUMENTS 5,807,042 A * 9/1998 Almblad et al. ............ 250/202
6,064,747 A * 5/2000 Wills et al. ................. 382/100

* cited by examiner

Primary Examiner—William Briggs
(74) Attorney, Agent, or Firm—William Nitkin

(57) ABSTRACT

The invention relates to a key decode apparatus for helping to automatically extracting and measurement depths and spacings of cuts an object key and decodes when duplicating an original key. A key holder is provided forming shadow image of a key side view by positioning the original key vertically along its longitudinal axis with the key's flat sides in vertical plane, position an object key between video camera and luminescent light strip. The video camera gets the shadow image of the key side view and sends it to a computer that stores the shadow image in memory that may measure depths and spacings of key cuts and compares with known original key manufacturers information in memory, decodes and sends it to be displayed and can be used in cutting machine for duplicating the key.

4 Claims, 5 Drawing Sheets

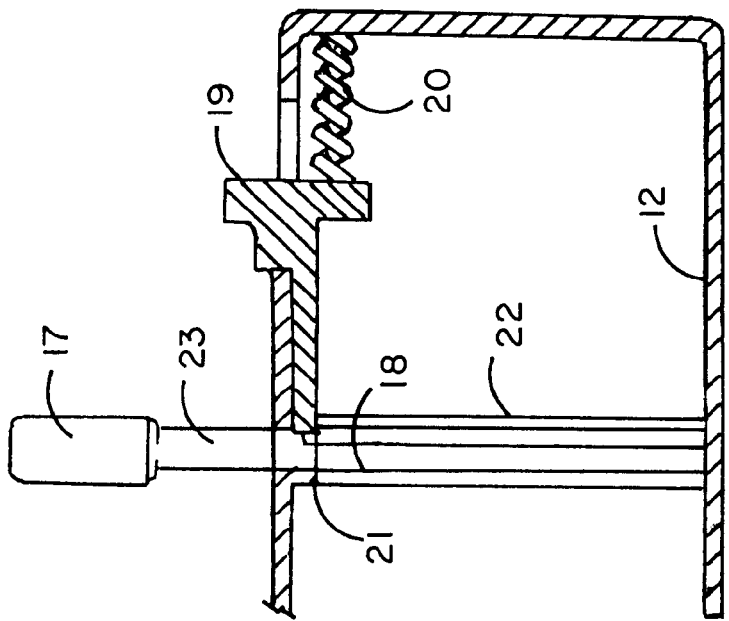
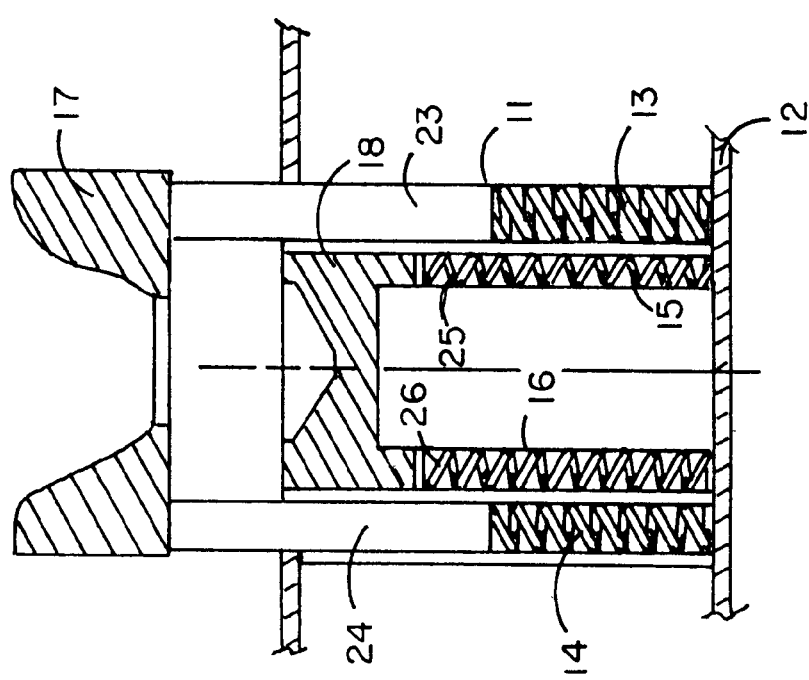

DEVICE TO HELP DETERMINE KEY CUT ATTRIBUTES

BACKGROUND OF THE INVENTION

This invention generally relates to automatic key duplication, and more particularly a device to help automatically determine key cut attributes.

In the key making art, each lock manufacturer has adopted a number of different key blanks, each with its own unique shape and specific groove characteristics. Further, for each key blank, the manufacturer has assigned one or more known key cut codes that define the manner in which the key blank can be cut to match the manufacturer's lock.

Once a locksmith determines which key blank it is among the thousands made, he must be skilled at tracing or cutting the notches, cuts or bits of the object key into the correctly identified key blank. If the key cuts are not traced precisely, then the new key will not work in the lock.

The manufacturer's key cut codes define the relationship between the cuts and key blank, and between one cut and other. The following characteristics or attributes are representative:

1) the distance from the key shoulder to the center of the first cut;
2) the distance between cuts, distance being measured from the center of one cut to the center of an adjacent cut;
3) the depth of each cut;
4) the angle of each cut;
5) the length of the flat at the bottom of each cut;
6) the distance between the tip and key shoulder.

Once such attributes of an object key can be extracted, recognized, and compared to that which was supplied by an original key manufacturer, and after the appropriate key blank is selected, a new key duplicating the original can be selected and cut.

Various types of key making machines currently exist which identify and utilize a key manufacturer's coding to duplicate a customer's key. However, none of the following patents teaches a method or apparatus that helps to extract object key information absent some means of making physical referential contact with the object key.

U.S. Pat. No. 2,070,228, issued in 1935, is a seminal patent relating to key cut codes. The device disclosed measures relative depth of key cuts using spring-loaded tumblers that make physical contact with key cuts. Analysis of the slope of the key cut is not considered, though. The acquired data is then used by a locksmith to determine an appropriate key code.

U.S. Pat. No. 4,090,303, relating to a key decoding apparatus, discloses a method of determining the original key cuts utilizing manufacturer's predetermined key cut depth and spacing. The key decoding apparatus disclosed employs an index card having sequential indexes thereon corresponding to a predetermined coded depth of the key desired to be duplicated. This card is inserted into a housing and the key to be duplicated is inserted into a slot in the housing where it engages an indexing member which enters one of the key cuts on the key and indicates on the card the coded depth of the key cut. The angle of the cut of the same key cut may also be determined. The remaining key cuts of the key may be decoded in like manner.

U.S. Pat. No. 3,796,130 issued in 1974 to Garner discloses a semiautomatic key duplicating and vending machine. This device requires the customer to place his key into one of a plurality of slots, each slot adapted to receive a key blade of a different cross-section corresponding to the shape of one of the blanks in storage. Selection of the proper slots provides a means for selecting the appropriate key blank in storage and automatically positions such blank for trace cutting a duplicate profile to that of the customer's key. The principal disadvantages of such a device are that smaller keys fit into larger holes, its inability to determine the differences in key blade length or shoulder position which can distinguish one key blank from another, and the fact that this device merely duplicates the cut features of the customer's key which may be overly worn.

U.S. Pat. No. 4,717,294 discloses a key cutting device, which cuts key blanks by employing a set of coded depth keys supplied by the lock manufacturer.

U.S. Pat. No. 4,899,391 discloses a system for identifying an appropriate key blank from a pattern comprised of a plurality of horizontal grooves of a predetermined depth and spacing taken from the image of the front profile of the key. The principal disadvantage of such a device is that it cannot measure depths of cuts and so cannot decode the characteristics of the key cuts.

U.S. Pat. No. 3,442,174 issued to Weiner et al. for a key blank dispensing and cutting apparatus that requires the assistance of the customer in selecting a slot in which to insert the blade of the key. Once having found the slot, the blank identification process is completed. Unfortunately, the apparatus only allows for identification of the profile of the key and does not take into account keys having identical profiles and varying lengths and shoulder positions and smaller keys that fit into larger holes. Moreover, the apparatus is limited to forty-eight known key blanks. Additionally, the selection method disclosed reveals mechanical push rods, one for each of forth-eight key blanks to push a key blank out of its respective key.

Other representative art includes U.S. Pat. No. 5,245,329, 5,050,462; 4,929,129; and 3,358,561.

These above methods and apparatus for automatic key making require skill on the part of the operator to fixture the object key in some fashion.

While unrelated to the key making, art, the following patents are nevertheless of note. U.S. Pat. No. 4,809,341 teaches a method and apparatus used in semiconductor device fabrication for a reticule or mask image, which has a slight modification of reduction or magnification, using a comparison method in which the real image pattern is compared with the pattern produced from design data. U.S. Pat. No. 4,805,224 reveals a pattern recognition method and device employing second order differential analysis of distinctive features. Other art referenced includes U.S. Pat. No. 4,143,582; 4,324,513; 5,120,010; 5,103,120; 4,899,391; and 3,796,130.

U.S. Pat. No. 5,807,042 discloses a system for automatically extracting attribute information by automatically reading an object key and comparing the attributes of the object key with a master pattern memory of known manufacturers' keys. Then it selects the proper matching key blank and cuts it to the original key cut codes established by the manufacturer. Alternatively, the key blank can be trace-cut, duplicating the used attributes of the object key. Alternatively, key cuts hybridizing the key cut features of the object key and key cut codes of a known manufacturer's key may be determined for use with the corresponding key blank. For decoding depth of key cuts this invention may comprise a transparent section on which an object key may be supported which is rotated and a back lighting means is used to pass light through the transparent section and project an image of the object key. From the image received, the position of the longitudinal centerline of the object key relative to a fixed datum is determined and an output signal generated. The object key may then be rotated to align it. Object key attributes may thus be extracted without fixturing or confining the object key in a holder or like device and a correct key blank may be identified.

This system consists of many sensitive mechanical, electrical and rotating, moving optical devices, and as the result will likely be unreliable and inaccurate. This system is also very sensitive to vibration and cannot be made portable, so it cannot be useful in the field, and will need constant adjusting and maintenance by a highly educated specialist.

SUMMARY OF THE INVENTION

A primary advantage of the present invention is to provide an apparatus to help in determining key cut information without having to physically engage each key cut.

Another advantage of the present invention is to provide a device that uniformly, and without skilled intervention, positions a variety of keys for helping to extract key cut information.

In accordance with a preferred embodiment of the present invention, a device to help determine key cut attributes comprises a holding device to uniformly hold an object key, a luminescent device on one side of the held object key and a device on the other side of the object key to store an image of the object key created by the outline created by the luminescent device.

In accordance with another preferred embodiment of the present invention a device for helping to extract key cut information comprises a key holder to position a key vertically between a luminescent light strip and motionless camera to create an outline of the key cuts for storage in a computing device.

Other objects and advantages of the cutting-device will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIGS. 3A and 3B are fragmentary front and side views of a preferred embodiment of the object key holding means.

DETAILED DESCRIPTION OF THE INVENTION

Detailed descriptions of the preferred embodiment are provided herein. It is to be understood, however, that the present invention may be embodied in various forms. Various aspects of the invention may be inverted, or changed in reference to specific part shape and detail, part location, or part composition. Therefore, specific details disclosed herein are not to be interpreted as limiting, but rather as a basis for the claims and as a representative basis for teaching one skilled in the art to employ the present invention in virtually any appropriately detailed system, structure or manner.

Figures 2A, 2B, 2C:
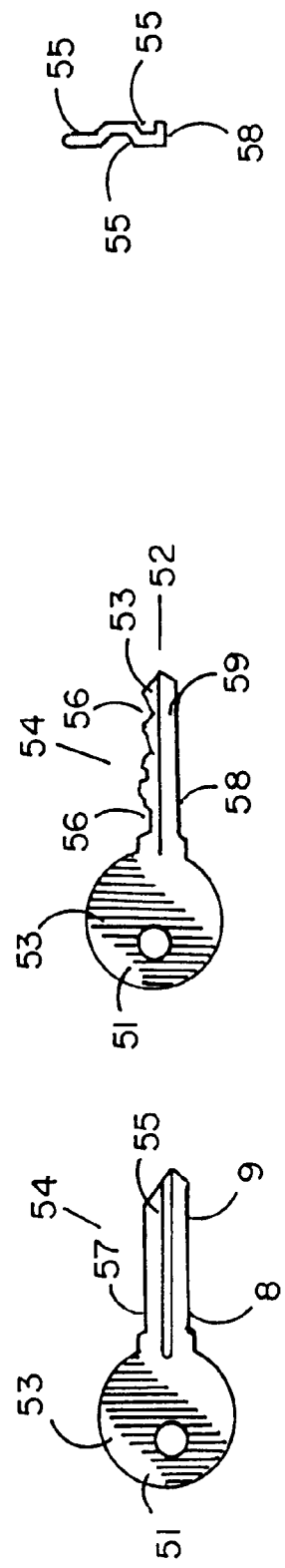
FIGS. 2A, 2B and 2C are a side elevation view of a key blank.

A standard key 51 as shown in FIGS. 2A, 2B and 2C has a head 53 and a shank 54. For purposes of explanation, flat sides 59 of shank 54 are positioned vertically and shank 54 is extended horizontally in relationship to head 53. Along flat sides 59 of shank 54 are grooves and indentations 55. Grooves and indentations 55 are unique to individual manufacturers. Vertical notches 56 along top 57 of shank 54 and, at times, along the bottom 58 of shank 54, transform the key blank of FIG. 2A into a key 51 uniquely notched for a particular lock. The manufacturer's unique coding system of grooves and indentations 55 are most easily identified in a head-on view of front 52 of shank 54 as shown in FIG. 2C. It is the front view, which provides the distinctive features, which allow many different devices and methods to distinguish key blanks among manufacturers and among specific manufacturer's product lines. An important aspect of this invention is a key holder that in one of its preferred embodiments, orients the object key into an operative positional relationship before extracting its attributes, leaving the object key independent of constraint.

This invention may comprise a key holder which forms a shadow image of a key side view by holding a luminescent light strip vertically and positions key before light vertically along its longitudinal axis with the key flat side in parallel with light strip. From the shadow image received by camera 30 which optical axis is established in perpendicular with flat key side, the key attributes may be extracted using computer algorithms, not part of the present invention, without rotating, fixturing or confining the object key. Thereafter, the correct measurements and decoding may be done.

Figure 1:
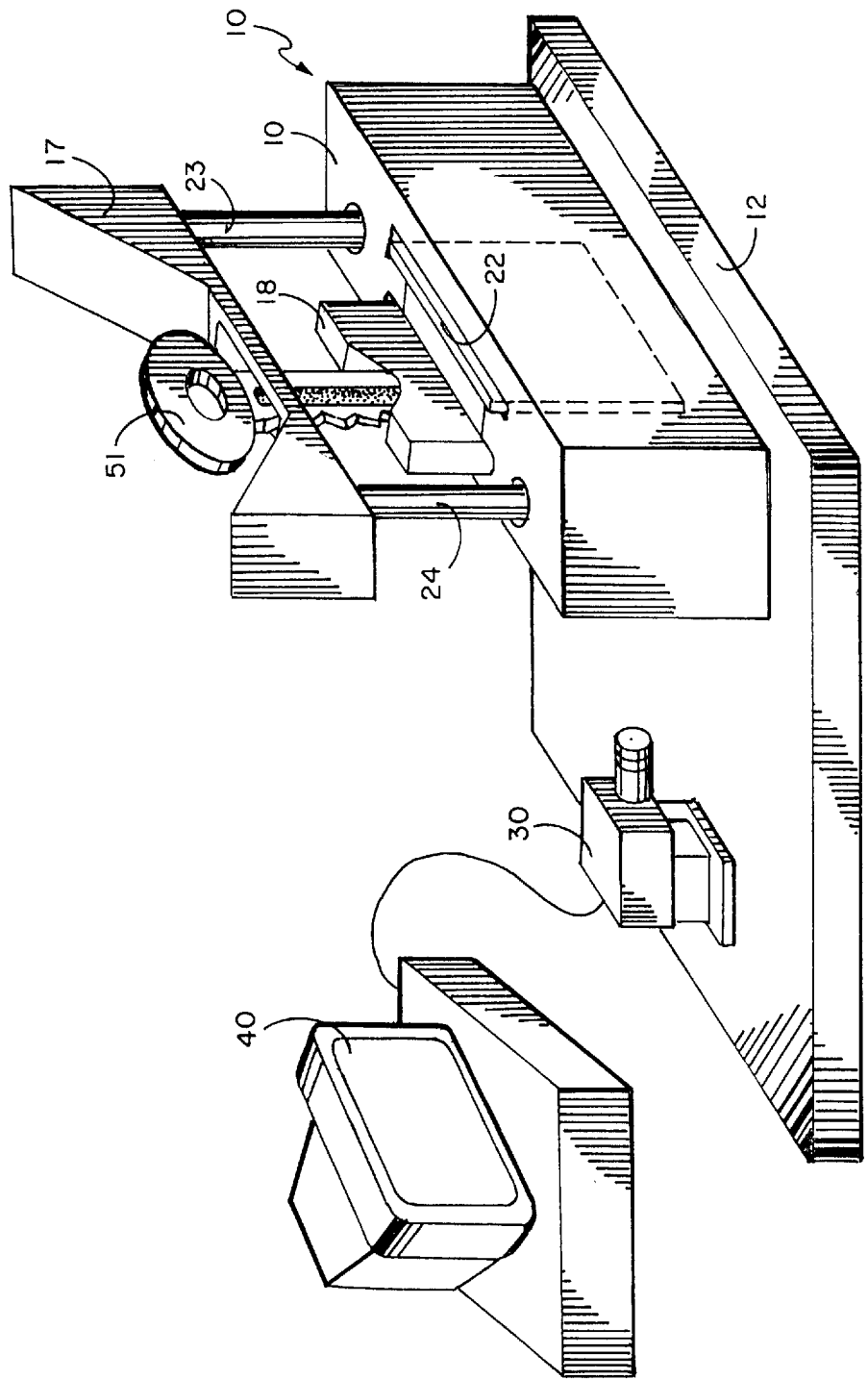
FIG. 1 is a perspective view of a preferred embodiment of object key holding means and assembly of luminescent light strip, camera and computer of the present invention.

Referring more particularly to the drawings in detail wherein like numerals indicate like elements, there is shown in FIG. 1 an automatic key decoder comprised of a key holder 10, a video camera 30 and a computer 40. Key 51 to be duplicated is inserted into the key holder 10, which provides the shadow image of the key side view. Video camera 30 is mounted forward of the key holder 10 so that optical axis is perpendicular to key side front. The shadow image captured by camera 30 passed to computer 40 which stores the image into its memory. Thereafter, and not part of the present invention, a program may be crated that measures the depths of the cuts and decodes cuts.

The key holder 10 is most clearly shown in FIGS. 3A and 3B. The main purpose of the key holder 10 is to hold all keys with different head and length in a true vertical position. The next purpose of the key holder 10 is to hold the luminescent light strip in parallel with the key flat side of key. It is provided that even light will create a distinct shadow image of the key side view. In the illustrated embodiment, luminescent strip is a phosphorescent thin plastic strip may by Luminescence Systems, Inc., part number 30433-1. Key holder 10 has housing 11 mounted on horizontal base 12. Within housing 11 are four vertical holes with for springs 13, 14, 15 and 16, respectively. The holder has generally V-shaped head 17, generally V-shaped tip 18, movable door 19 with spring 20, fixed door 21 and luminescent light strip 22, mounted inside housing 11 in vertical position and parallel with holes and spring 13, 14, 15 and 16. V-shaped head 17 and V-shaped tip 18 and have two dowels 23, 24 and 25, 26, respectively to provide vertical movement. Springs 13, 14, 15 and 16 provide V-shaped head 17 and V-shaped tip 18 to install a key in an upright position and to move independently from each other. The form of head V-shaped head 17 is fit for all shaped key heads with different from heads and the form of V-shaped tip 18 is fit for the tip of all keys. Movable door 19 is pressed to fixed door 21 with spring 20 for the purpose of clamping key 51.

Figure 4A:
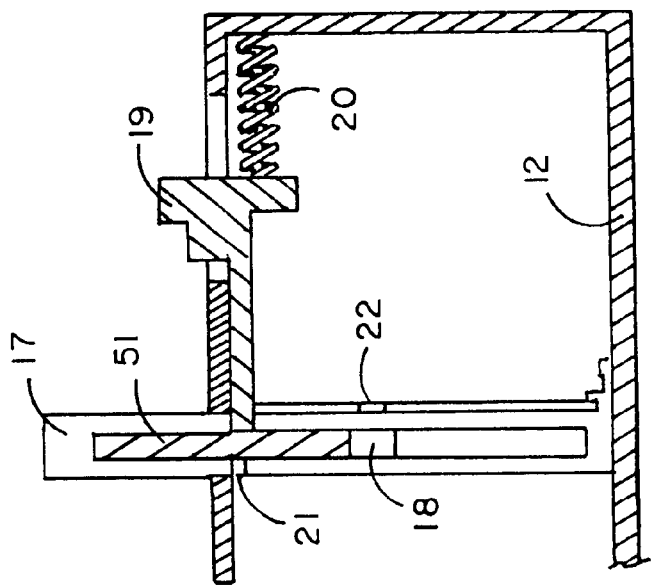
FIGS. 4A and 4B are fragmentary front and side views of a preferred embodiment of the object key holding means of FIG. 3 with key.
Figure 4B:
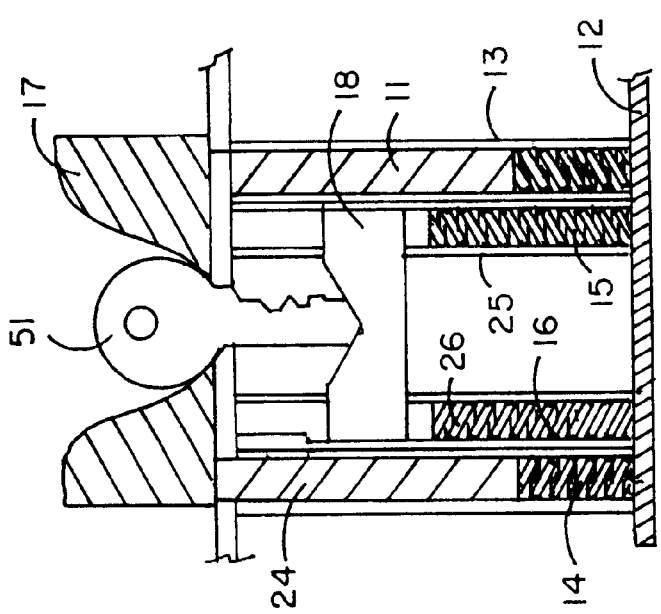
Figure 5C:
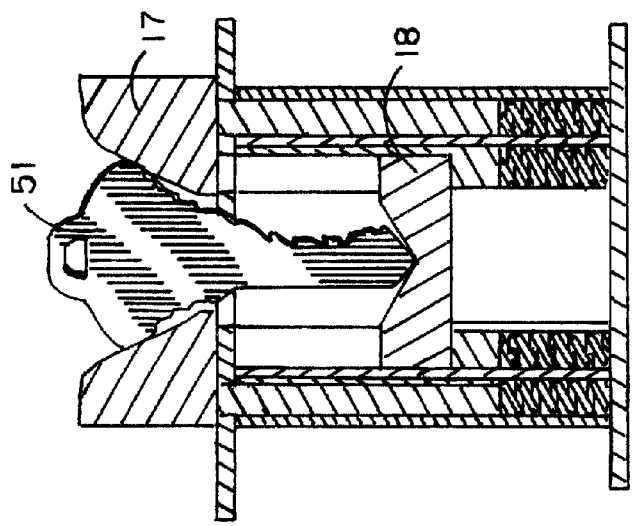
FIGS. 5A, 5B and 5C are fragmentary front views of a preferred embodiment of the object key holding means FIG. 3 without key and with long and short keys with different handles.
Figure 5B:
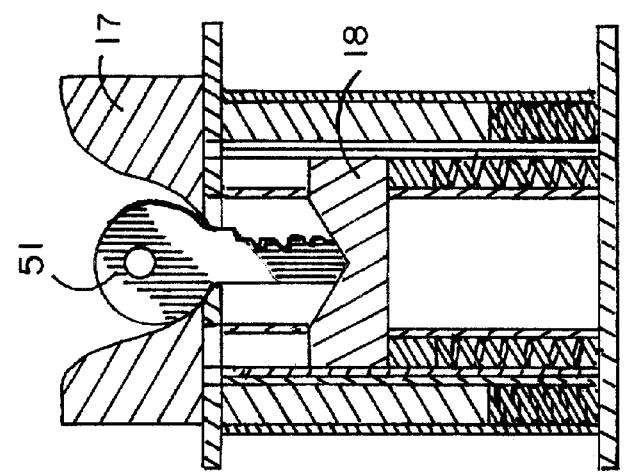
Figure 5A:
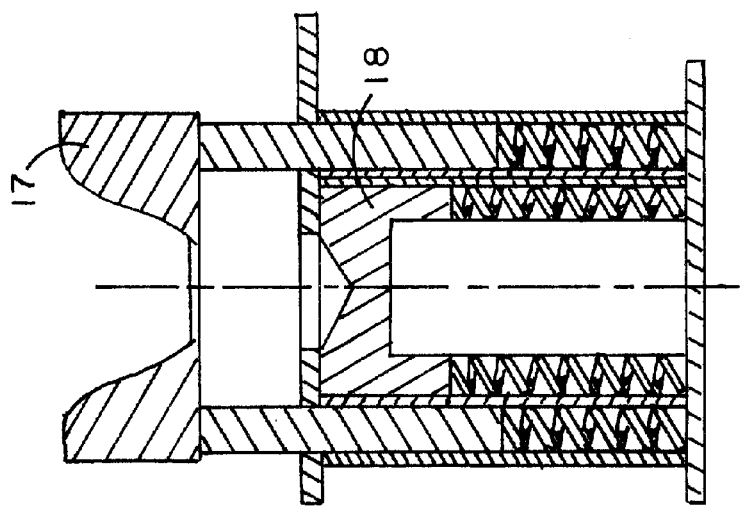

As depicted in FIGS. 4A, 4B and 5A a short key 51 is inserted in holder 10 until the bottom of the V-shaped head 17 meets housing 11. Simultaneously, the tip of key 51 will touch the V-shaped tip 18 and push it downward. Before key 51 is installed in holder 10 movable door 19 is opened. After installing key 51 movable door 19 is closed and key 51 will be clamped. Because symmetrical axis's of V-shaped head 17 and V-shaped tip 17 are in one vertical line, the symmetrical axis of key 51 will be placed in a vertical position automatically. In a similar fashion, a long key with a different head can be installed in holder 10, as illustrated in FIG. 5C. In this way, key holder 10 provides installation in vertical position for different lengths of and different head shaped keys.

As it was clearly shown in FIG. 4B the luminescent light strip 22 is installed in vertical position and in parallel with flat side of key 51, which provides even back-lighting of the key and the best shadow image of the key side view. As depicted in FIG. 1, the shadow image is picked up by video camera 30, which is mounted on horizontal base 12 in front of key 51 so that the camera's optical axis is perpendicular to the flat side of key 51 and provides a good picture of the key shadow image with a very clear key 51 outline. Further, the output signal from camera 30 is input to computer 40. With the object shadow image captured by camera 30 and processed by computer 40 through an analog-to-digital converter, the attributes of an object key may be identified. Though not part of the present invention, computer 40 may provides a pattern recognition means for recognizing a pixel pattern from an object image of the object key, and for producing a series of code signals with respect to each target pixel from the result of the recognition. The code signals define traits of the recognized pixel pattern for each target pixel, where the pixel patterns define attributes of the object key. Moreover, the computer may be programmed to discriminate between various pixel patterns. A pattern memory in which a set of predetermined master patterns is stored in the ROM of the computer. Each predetermined master code signals define traits of a master pixel pattern, where the master pixel pattern defines attributes of a selected manufacturer's key. The computer may be programmed to compare the code signals from the pattern recognition means with a corresponding master code signal and to produce an identifying signal that defines a corresponding key blank with a predetermined master pattern having master code signals that match code signals from the result of the recognition of the pixel pattern of the object key. This process allows a corresponding key blank matching attributes of a known manufacturer's key to be determined and after that to measure depth of key cuts and decode.

The present invention allows the key to be simply situated within a specified holder, and operates automatically to possibly the key, to extract key attributes so that corresponding key cut codes can be identified for corresponding key blank which can be identified previously. Furthermore, a superior device is disclosed herein is very simple and has only two moving parts, subject to high reliability and accuracy.

While the current mode contemplates the use of one computer to serve all controlling and processing functions, separate, individual controllers could easily be employed.

While this invention has been described in connection with the best mode presently contemplated by the inventor for carrying out his invention, the preferred embodiments described and shown are for purposes of illustration only, and are not to be construed as constituting any limitations of the invention. Modifications will be obvious to hose skilled in the art, and all modifications that do not depart from the spirit of the invention are intended to be included within the scope of the appended claims.

What is claimed is:

1. A device to help determine key cut attributes for object keys having a longitudinal axis, comprising:

a holding device to uniformly hold an object key, said object key having a flat first side and a second side, said object key disposed vertically in a plane along said object key's longitudinal axis;

a luminescent strip positioned parallel to said object key's flat first side and disposed on said second side of said held object key for illuminating the outline of said object key;

an image storage device disposed on the first side of said object key to store an image of said object key created by the outline illuminated by said luminescent strip;

said holding device further including:

a horizontal base;

a housing mounted on said base and having a front and rear and first, second, third and fourth vertical holes defined in said housing in line and first, second, third and fourth springs positioned, respectively, in said first, second, third and fourth holes;

a vertical aperture defined in said rear of said housing;

an opening defined in said front of said housing;

said luminescent light strip positioned vertically in said housing parallel with said line of vertical holes in said housing;

a head V-shaped retention device which fits different heads of all keys to cause automatic vertical positioning of said object key, said head V-shaped retention device having two dowels extending therefrom moving in said first and fourth vertical holes of said housing, said dowels urged upwards by said first and fourth springs;

a tip V-shaped retention device which fits different tips of all keys to cause automatic vertical positioning of said object key, said tip V-shaped retention device having two dowels moving in said second and third vertical holes of said housing, said dowels urged upwards by said second and third springs; and a first motionless open door vertically defined in said housing in which said object key is positioned when moved downward in said head V-shaped retention device and tip V-shaped retention device and a second movable door having a spring, which second movable door moves against said object key after said object key in inserted in said housing and said object key is moved downward into said first door, said second movable door urged by said spring against said object key to retain said object key in position during analysis.

2. The device as recited in claim 1 wherein said image storage device includes a video camera having an optical axis, said video camera being mounted on said horizontal base before said housing, the optical axis of which camera is aligned perpendicularly to the flat side of said object key when said object key is inserted in said holding device and in said first open door in front of said luminescent strip.

3. The device as recited in claim 2 wherein said video camera converts said image into electrical signals.

4. The device as recited in claim 3 further including:

a computer having memory which computer receives said electrical signals of said image from said video camera and stores and processes said electrical signals to determine the key cut attributes of said object keys.

* * * * *